W. C. ZELLE.
CLUTCH MECHANISM.
APPLICATION FILED JULY 21, 1909.
965,270.
Patented July 26, 1910.
2 SHEETS—SHEET 1.
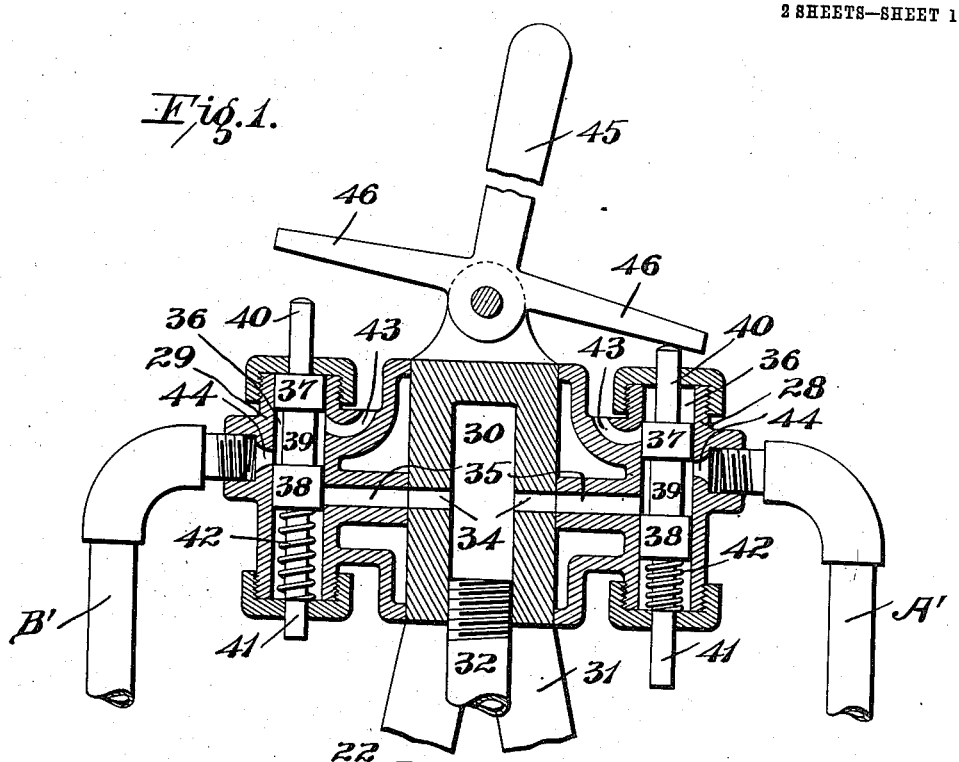
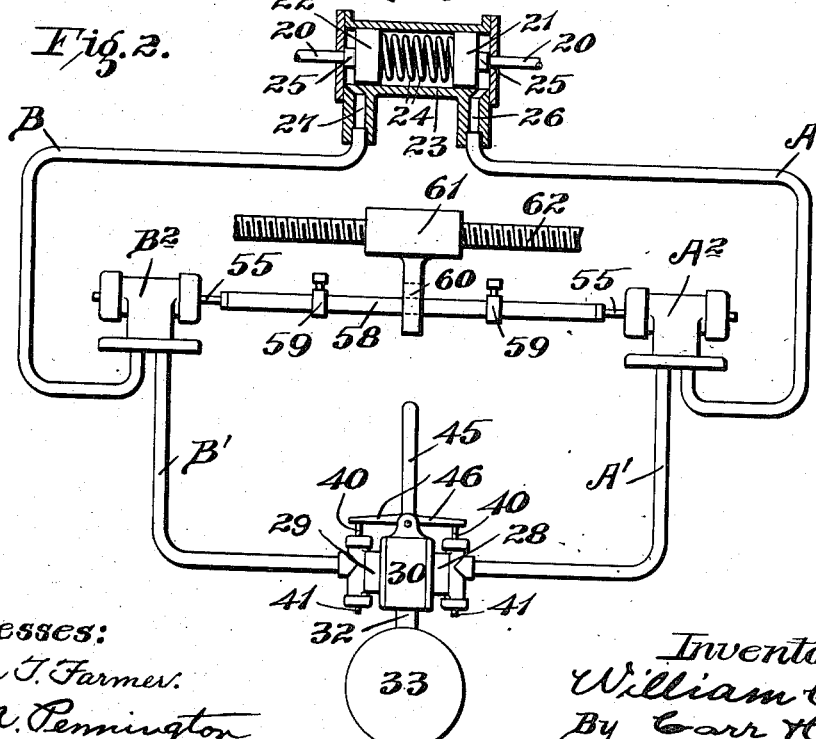
Witnesses:
Edgar T. Farmer.
G. A. Pennington
Inventor:
William C. Zelle
By Carr & Carr
attys.

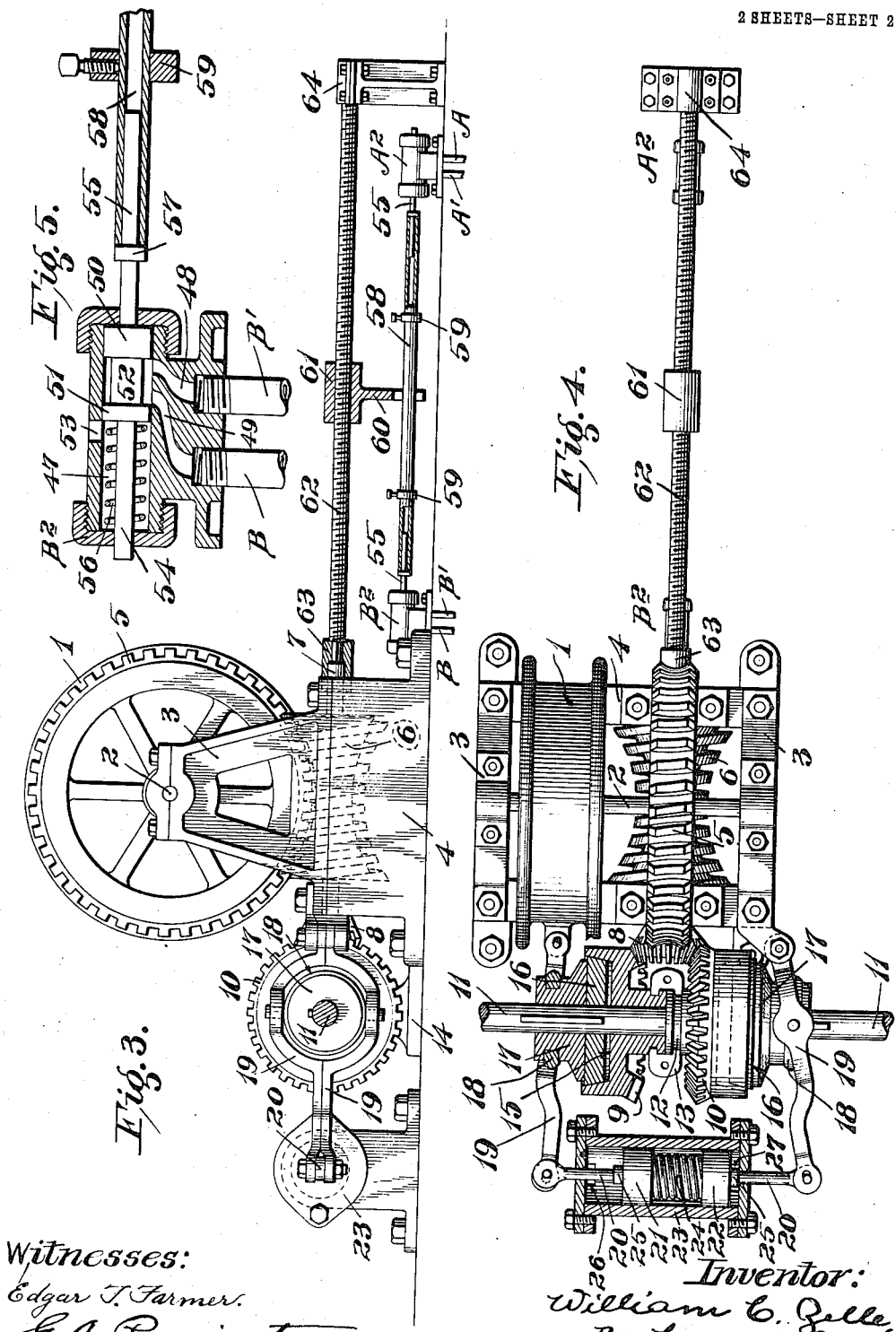

UNITED STATES PATENT OFFICE.

WILLIAM C. ZELLE, OF ST. LOUIS, MISSOURI.

CLUTCH MECHANISM.

965,270.  Specification of Letters Patent.  Patented July 26, 1910.

Original application filed November 27, 1908, Serial No. 464,719. Divided and this application filed July 21, 1909. Serial No. 508,760.

*To all whom it may concern:*

Be it known that I, WILLIAM C. ZELLE, a citizen of the United States, and a resident of the city of St. Louis and State of Missouri, have invented a new and useful Improvement in Clutch Mechanisms, of which the following is a specification.

The subject matter of this application is divided out of an application for patent for portable loading machine, Serial No. 464,719, filed by me on November 27, 1908.

The invention relates to clutch mechanisms.

It has for its principal objects to produce a simple and effective clutch mechanism; to produce a reversing clutch mechanism; to provide for the actuation and control of the mechanism by compressed-air; to provide for the automatic release of the clutch at a predetermined time; and to secure certain advantages hereinafter more fully appearing.

The invention consists in the parts and in the arrangements and combinations of parts hereinafter described and claimed.

In the accompanying drawings forming part of this specification and wherein like symbols refer to like parts wherever they occur, Figure 1 is a vertical section through a reversing throttle arranged according to my invention; Fig. 2 is a diagram illustrating a system of pneumatic control for the clutch mechanism according to my invention; Fig. 3 is a view partly in side elevation and partly in vertical section of a winding drum and actuating mechanism therefor provided with a reversing clutch and controlling mechanism embodying my invention; Fig. 4 is a view partly in top plan and partly in horizontal section of the parts shown in Fig. 3; and, Fig. 5 is a fragmentary vertical section of a safety valve and portion of the actuating device therefor.

In the accompanying drawings, my invention is illustrated in connection with a winding drum mechanism for a hoisting machine or the like. The drum 1 is fixedly secured on a horizontal shaft 2 which is journaled in side frames 3. The side frames 3 are mounted on a base frame 4. Secured on the shaft 2 is a worm wheel 5 which meshes with a worm screw 6 which is secured on a cross shaft 7. The shaft 7 is journaled on the base frame 4 and has a bevel pinion 8 on its end which meshes with two oppositely disposed bevel gears 9, 10, respectively. These bevel gears are loosely mounted on a driving shaft 11 so as to rotate freely thereon but are held from moving endwise thereof. Preferably, the gears 9, 10 have abutting hub portions 12 which are grooved peripherally so as to coöperate with counterpart portions of a coupling member 13. The coupling member 13 is stationarily mounted on a standard or bracket extension 14 of the base frame 4 or otherwise fixed so as to hold the gears 9, 10 from endwise movement.

The gears 9, 10 are each provided with an outwardly flaring circular pocket 15 in their outer ends. In these pockets are adapted to fit tapering clutch portions 16 of clutch members 17 which are feathered on the driving shaft 11 so as to be shifted endwise thereon. The members 17 are provided with annular grooves in which are fitted rings 18 which are swiveled to shifting levers or yokes 19. The yokes 19 are pivotally secured at one end by suitable slot-and-pin connections to the supporting frame for the winding drum, while their opposite ends are similarly secured to the outer ends of rods 20 of pistons 21, 22, respectively, in an air cylinder 23. A coiled spring 24 is interposed between the two pistons 21, 22, so as to yieldingly hold the same normally outward near the respective end heads of the cylinder, in which positions of the pistons the clutch members 17 are disengaged from the gears 9, 10 on the driving shaft.

The piston rods 20 are provided with collars 25 next to the outer faces of the pistons so as to prevent said pistons from moving into contact with the end heads of the cylinder. The cylinder 23 is provided at its ends with ports 26, 27, respectively, which communicate with the spaces between the outer faces of the pistons and cylinder heads. These ports also communicate with air pipes A, B, respectively, which lead from a source of air pressure supply in a manner hereinafter more fully appearing.

The controlling device comprises, preferably, two throttle-valves 28, 29. These valves are secured on opposite sides of a hollow casting or air duct 30 which is mounted upon a suitable support or frame 31 and located within convenient reach of an operator. This air duct is connected with a supply pipe 32 which communicates with an ordinary compressed-air receiver or tank 33 or other suitable source of compressed-air supply. The air duct 30 is provided with openings 34 in its opposite sides which communicate with ports 35 in the valve castings 28, 29. The ports 35 communicate with the vertical bores 36 in the valve castings in each of which is slidably fitted a cylindrical valve block having enlargements or heads 37, 38, and a reduced intermediate portion or shank 39. The valve blocks have axial stem portions 40, 41 projecting from opposite ends thereof through central openings in the top and bottom heads of the valve cylinders. A spring 42 is coiled around the lower stem 41 of each valve block between the enlargement 38 and adjacent head of the cylinder so that the block is resiliently held in normally raised position.

The valve blocks are so proportioned that their lower enlargements 38 normally close the ports 35, while the reduced intermediate portions 39 of the blocks are of such a length that communication is established between an exhaust port 43 in the valve casting and a port 44 therein which communicates with an air pipe A' or B' according to which one of the valves is referred to. The distance from the exhaust port 43 to the port 44 is substantially the same as the distance between said port 44 and the port 35, so that when the valve block is depressed, communication is established between said two last mentioned ports. In the depressed position of the valve block the exhaust port 43 is closed by the upper enlargement 37 of the valve block as shown to the right in Fig. 1 of the drawings.

Pivotally mounted on the air duct 30 is a hand lever 45 having two oppositely extending lateral arms 46 which overhang the ends of the upwardly projecting valve stems 40. Normally, the hand lever is held in vertical position by the resiliently supported valve blocks whose stems 40 bear against the undersides of said lateral arms 46 as shown in Fig. 2 of the drawings. By this arrangement, the hand lever may be swung to either side, as the case may be, to depress the valve block it is desired to actuate and leave the opposite valve block in normal position, as shown in Fig. 1. For example, the pipes A', B' may be connected respectively to the pipes A, B which communicate with the ports 26, 27, respectively, in the air cylinder 23. If it is desired to actuate the piston 21 in the air cylinder, the valve block in the valve casting 28 is depressed, thereby opening communication from the air supply tank 33 through the pipe 32, air duct 30, pipes A' and A, and port 26 in the air cylinder to the outer face of the piston. The port 35 in the opposite valve casting 29 being closed by the valve block and communication being opened between the exhaust port 43 and the pipe B', there will, of course, be no resisting pressure against the piston 22. Hence, the piston 21 will be moved inwardly and thereby the clutch member 17 will be forced into engagement with the gear 9. Thus, the motion is transmitted from the driving shaft to the bevel pinion 8 on the shaft 7 of the actuating mechanism for the winding drum. When it is desired to stop the rotation of the driven shaft 7, the hand lever is moved back to normal position, whereupon the pressure in the pipes A, A' and the air cylinder is exhausted through the exhaust port 43 in said valve casting 28. If it is desired to reverse the rotation of the driven shaft 7, the hand lever is thrown reversely to actuate the opposite throttle valve, whereupon the piston 22 will be actuated to throw its associated clutch member 17 into engagement with the bevel gear 10.

In cases where it is necessary to reverse or stop the actuation of the driven mechanism at a predetermined time, it is desirable to provide a device adapted to automatically exhaust the air pressure from the air cylinder 23 in order to release the clutch in case the operator fails to reverse the controlling lever 45 or restore the same to normal position at the proper time. As shown in the drawings, two safety-valves $A^2$, $B^2$ are provided, one for each of the respective pipe connections to the air cylinder. Each of these safety-valves comprises a cylindrical chamber 47 having ports 48, 49 which open into the cylinder close together near one end thereof. A reciprocatory cylindrical valve-block is provided in the cylinder. This block has heads or enlargements 50, 51 and a reduced intermediate portion or shank 52. The shank portion is of a length sufficient to span the two port openings 48, 49 so as to establish communication therebetween when the block is at the end of the cylinder as shown in Fig. 5 of the drawings. The air pipe A' or B', as the case may be, leading from the air supply tank 33 is connected with the port 48; and the pipe A or B, as the case may be, leading to the air cylinder 23 is connected with port 49 of the respective safety-valves $A^2$, $B^2$ so that normally the pipe connections between the throttle valves 28, 29 are completed through said valve cylinders.

An exhaust port 53 is provided in the safety-valve cylinders and it is normally cut off from communication with the ports 48, 49 by the enlargement 51 of the valve-block. The exhaust port 53 is, however, located at such a distance from the port opening 49 that the shank portion 52 of the valve-block will span said ports 49, 53 when it is moved inwardly until its enlargement 50 closes the port 48. Thus, the air pressure is cut off from said pipe A or B and the pressure in said pipe and the air cylinder 23 is exhausted through said port 53.

The safety-valves $A^2$ $B^2$ are preferably operated in the following manner: The valve-blocks are provided at their opposite ends with stems 54, 55 which project through central openings in the heads of the valve cylinders. A spring 56 is coiled around the stems 54 inside of the cylinders so as to bear against the valve-blocks and resiliently hold the same in normal position. The opposite stems 55 project to the outside of the cylinders for a considerable distance and are provided with collars 57 against which the ends of a sleeve or tubular rod 58 are adapted to bear. This rod loosely fits said stems 55 and it has two collars or stops 59, preferably adjustably mounted thereon in the path of a projection 60 on a nut 61 which is threaded on a screw 62. This screw is connected to the shaft 7 of the winding drum mechanism so as to receive motion therefrom. Preferably, this screw 62 is connected axially at one end to the shaft 7 by a coupling 63 and is journaled at its opposite end in a bearing 64. The screw is arranged in parallel relation to the rod 58 and the lower end portion of the projection 60 on the nut 61 is bifurcated so as to straddle said rod. By this arrangement, the nut is held against rotation, but it will travel lengthwise on the screw when said screw is rotated. While the screw is rotating the nut 61 will move along the same until its projection 60 engages one of the stops 59 on the rod 58 adjacent to the valve $A^2$, $B^2$ depending upon the direction of rotation of the screw. The continued travel of the nut will cause the rod 58 to move therewith and thereby move the valve block inwardly until communication is established between the port 49 and exhaust port 53, and the port 48 is closed, whereupon the clutch will be automatically released should the operator fail to operate the controlling lever at the proper time to effect the release of the clutch.

When the safety valve has been operated as above set forth, the winding mechanism will become inactive and it cannot be again actuated in the same direction until the controlling lever 45 is restored to normal position and then operated reversely to open the opposite throttle-valve to conduct air pressure through the pipe connections to the opposite end of the air cylinder 23. When this has been done, the clutch mechanism opposite to the one previously operated will then engage its companion bevel gear on the driving shaft 11 and the shaft 7 will be rotated in a reverse direction, thereby reversely actuating the winding mechanism and also causing the nut 61 to travel reversely on the screw 62 and permitting the valve-block in the safety-valve previously operated to be restored to normal position by its spring 56.

As shown in Figs. 3 and 5 the safety valves $A^2$, $B^2$ are separately actuated by a single tubular rod 58 and nut 61. The collars 59 can be readily adjusted to various positions on the rod 58 so as to be engaged by the projection 60 on the nut 61 at different predetermined intervals. By the use of the safety devices the clutches in mechanisms whose actuations are necessarily of limited duration are automatically released in case the operator fails to operate the controlling lever at the proper time, thereby preventing probable damage to the working machinery as well as securing nicety of operation.

Obviously, the mechanism can be considerably modified without departing from the invention. Therefore, I do not wish to be limited to the specific construction and arrangement shown.

What I claim is:

1. A clutch mechanism comprising a driving member and a driven member, means for effecting the engagement of said clutch members, said means comprising an air chamber having a piston therein, said piston being operatively connected with one of said clutch members and adapted to be actuated to effect the engagement of said clutch members when pressure is admitted into the air chamber, a pipe connection between said air chamber and a source of compressed air supply, a manually operable device for controlling the admission of the air pressure into the air chamber and being also adapted to exhaust the air pressure in the air chamber, and a mechanically operable device for automatically cutting off the supply of the air pressure into the air chamber independently of said manually operable device and being also adapted to exhaust the air pressure in the air chamber, said mechanically operable device being operatively connected with the driven member so as to be actuated thereby at a predetermined time.

2. A clutch mechanism comprising a driving member and a driven member, means for effecting the engagement of said clutch members, said means comprising an air chamber having a piston therein, said piston being operatively connected with one of said clutch members, resilient means for moving said piston in one direction to disengage the clutch members, means for conducting compressed air into said air chamber to move the piston in the opposite direction to effect engagement of the clutch members, a manually operable device for controlling the admission of the air pressure into the air chamber and being also adapted to exhaust the air pressure in the air chamber, and a mechanically operable device for automatically cutting off the supply of the air pressure into the air chamber independently of said manually operable device and being also adapted to exhaust the air pressure in the air chamber, said mechanically operable device being operatively connected to the driven member so as to be actuated thereby at a predetermined time.

3. A clutch mechanism comprising a driving member and a driven member, means for effecting the engagement of said clutch members, said means comprising an air chamber having a piston therein and said piston being operatively connected with one of said clutch members, a pipe connection between said air chamber and a source of compressed air supply, a manually-operable valve in said pipe connection adapted to control the admission of the air pressure into the air chamber and being also adapted to exhaust the air pressure in the air chamber, and a mechanically-operable valve in said pipe connection adapted to automatically exhaust the air pressure in the air chamber at a predetermined time.

4. A reversing clutch comprising two reversely-acting pairs of companion driving and driven members, respectively, means for effecting the engagement of the companion driving and driven members of either pair, said means comprising an air chamber having two separate pistons therein, one of the pistons being operatively connected with one of the clutch members of one pair and the other piston being likewise connected with one of the clutch members of the other pair, resilient means acting upon said pistons to move the same in one direction to disengage the clutch members of the respective pairs associated therewith, two separate pipe connections communicating with a source of compressed air supply and leading into said air chamber at different points to conduct the air pressure separately to the two pistons to move the same to effect the engagement of their respective associated pairs of clutch members, a manually-operable controlling device adapted to simultaneously throttle both of said pipe connections and at the same time exhaust the air pressure in the air chamber to effect the disengagement of both pairs of clutch members, said manually-operable device being also adapted to admit air pressure alternately to each of said two pipe connections, and a mechanically-operable valve in each of said pipe connections adapted to automatically throttle the same and exhaust the air pressure in the air chamber at a predetermined time.

5. A clutch comprising a driving member and a driven member, means for effecting the engagement of said clutch members, said means comprising an air chamber having a piston therein and said piston being operatively connected with one of said clutch members, resilient means for moving said piston in one direction to effect the disengagement of said clutch members, a pipe connection between said air chamber and a source of compressed-air supply, whereby said piston is moved in the opposite direction to effect the engagement of the clutch members, a manually-operable controlling valve in said pipe connection adapted to throttle said pipe connection and simultaneously exhaust the air pressure in said air chamber, a mechanically-operable valve in said pipe connection also adapted to throttle the same and simultaneously exhaust the air pressure in the air chamber, and a device for automatically operating said mechanically-operable valve at a predetermined time, said device being operatively connected with the driven clutch member so as to be actuated thereby.

6. A clutch comprising a driving member and a driven member, means for effecting the engagement of said clutch members, said means comprising an air chamber having a piston therein and said piston being operatively connected with one of said clutch members, resilient means for moving said piston in one direction to effect the disengagement of said clutch members, a pipe connection between said air chamber and a source of compressed-air supply whereby said piston is moved in the opposite direction to effect the engagement of the clutch members, a manually-operable controlling valve in said pipe connection adapted to throttle said pipe connection and simultaneously exhaust the air pressure in said air chamber, a mechanically-operable valve in said pipe connection also adapted to throttle the same and simultaneously exhaust the air pressure in the air chamber, and means for automatically operating said mechanically-operable valve at a predetermined time, said means comprising a rotatable shaft operatively connected with the driven clutch member so as to be actuated thereby, said rotatable shaft being screw-threaded and having a counterpart screw-threaded member thereon, said member being held from rotation and adapted to move endwise of the shaft when the same is rotated, and a device connected to said mechanically-operable valve and arranged to be engaged by said member on the rotatable shaft.

7. A reversing clutch comprising two reversely-acting pairs of companion driving and driven members, respectively, means for effecting the engagement of the companion driving and driven members of either pair, said means comprising an air chamber having two separate pistons therein, one of the pistons being operatively connected with one of the clutch members of one pair and the other piston being likewise connected with one of the clutch members of the other pair, resilient means acting upon said pistons to move the same in one direction to disengage the clutch members of the respective pairs associated therewith, two separate pipe connections communicating with a source of compressed air supply and leading into said air chamber at different points to conduct the air pressure separately to the two pistons to move the same to effect the engagement of their respective associated pairs of clutch members, a manually-operable controlling device adapted to simultaneously throttle both of said pipe connections and at the same time exhaust the air pressure in the air chamber to effect the disengagement of both pairs of clutch members, said manually-operable device being also adapted to admit air pressure alternately to each of said two pipe connections, a mechanically-operable valve in each of said pipe connections adapted to throttle the same and exhaust the air pressure in the air cylinder, and means for automatically actuating said last mentioned valves at a predetermined time, said means comprising a rotatable shaft common to and operatively connected with both of the driven clutch members so as to be actuated thereby in reverse directions, said rotatable shaft being screw-threaded and having a counterpart screw-threaded member thereon, said member being held against rotation and adapted to move endwise on the shaft in opposite directions depending upon the direction in which the shaft is rotated, and a device connected to each of said mechanically-operable valves and arranged to be engaged by said member on the rotatable shaft in either direction of its travel thereon.

8. The combination with a power shaft and a mechanism arranged to be actuated thereby, of a clutch mechanism adapted to operatively connect said power shaft and said first-mentioned mechanism, said clutch mechanism comprising an air chamber, a piston in said air chamber, said piston being operatively connected with one of the clutch members, and adapted to be actuated to effect the engagement of the clutch members when pressure is admitted into the air chamber, a pipe connection between said air chamber and a source of air pressure supply, a manually operable device for controlling the admission of the air pressure to said air chamber and for exhausting the air pressure therefrom, and a mechanically operable device arranged and adapted to cut off the supply of the air pressure to the air chamber and being also adapted to exhaust the pressure from said air chamber, said mechanically operable device being operatively connected to the driven mechanism and arranged to be actuated at a predetermined time.

9. The combination with a power shaft and a mechanism arranged to be alternately actuated in opposite directions, of a reversing clutch mechanism adapted to connect said power shaft and said first-mentioned mechanism, means for actuating said clutch mechanism in either direction, said means comprising an air chamber having working devices therein which are operatively connected with said clutch mechanism, and adapted to be actuated to effect the engagement of the respective clutch members when pressure is admitted into the air chamber, a pipe connection between said air chamber and a source of air pressure supply, a manually operable device for controlling the admission of the air pressure to said air chamber to effect the actuation of the clutch mechanism in either direction and being also adapted to exhaust the air pressure in said air chamber to render said clutch mechanism ineffective, and a mechanically operable device arranged and adapted to cut off the supply of the air pressure to said air chamber and being also adapted to exhaust the pressure therefrom, said mechanically operable device being operatively connected to the driven mechanism so as to be actuated thereby at a predetermined time when said driven mechanism is actuated in either direction.

10. The combination with a power shaft and a mechanism arranged to be alternately actuated in opposite directions, of a reversing clutch mechanism adapted to connect said power shaft and said first mentioned mechanism, said clutch mechanism comprising a pair of oppositely disposed bevel gears sleeved loosely on said power shaft and held against endwise movement, a shaft arranged at right angles to the axis of said driving shaft and having a bevel pinion fixed on the end thereof in mesh with both of said bevel gears on the driving shaft, said right angular shaft being operatively connected with the mechanism to be actuated, separate clutch members feathered on said driving shaft and adapted to engage the respective bevel gears, means for moving said clutch members into and out of effective position, said means comprising an air cylinder having two pistons therein, one of said pistons being operatively connected with one of said clutch members and the other piston being similarly connected to the other clutch member, resilient means acting upon said pistons to normally hold said clutch members disengaged from their respective bevel gears on the driving shaft, two separate pipe connections communicating with a source of compressed air supply and leading into said air cylinder at different points to conduct the air pressure separately to said pistons to effect the engagement of the respective clutch members with the bevel gears, a manually-operable device adapted to simultaneously throttle said two pipe connections and at the same time exhaust the pressure in the air cylinder, said manually-operable device being also adapted to admit air pressure alternately to each of said two pipe connections, a mechanically-operable valve in each of said pipe connections adapted to throttle the same and exhaust the pressure in the air cylinder, and means for automatically and alternately actuating said valves at a predetermined time during the actuation of the driven mechanism.

Signed at St. Louis, Missouri, this 19th day of July, 1909.

WILLIAM C. ZELLE.

Witnesses:
G. A. PENNINGTON,
J. B. MEGOWN.